United States Patent [19]
Williams

[11] 3,913,397
[45] Oct. 21, 1975

[54] STATIC WIND SPEED AND DIRECTION INDICATOR

[76] Inventor: William A. Williams, Oak Hill Apts. No. 422-S Hagy's Ford Road North, Penn Valley, Pa. 19072

[22] Filed: Mar. 28, 1974

[21] Appl. No.: 455,901

[52] U.S. Cl. .................................. 73/189; 73/401
[51] Int. Cl.² ..................... G01P 5/16; G01L 7/18
[58] Field of Search .............. 73/189, 182, 401, 402

[56] References Cited
UNITED STATES PATENTS
| | | | |
|---|---|---|---|
| 1,897,658 | 2/1933 | Apthorp | 73/189 |
| 2,701,474 | 2/1955 | Goudy | 73/189 |
| 3,120,127 | 2/1964 | Parrish | 73/401 |

*Primary Examiner*—James J. Gill
*Attorney, Agent, or Firm*—Paul & Paul

[57] ABSTRACT

Four wind sampling cups arrayed to the compass points are connected respectively to the tops of manometer tubes. The four tubes are supplied fluid at a bottom end by two pairs of chambers, the chambers of a pair being connected to one another. The manometer tubes of oppositely directed wind sampling cups share connected chambers, such that wind from a given direction drops the fluid level in the attached manometer and raises the fluid in the opposite manometer.

8 Claims, 5 Drawing Figures

U.S. Patent    Oct. 21, 1975    Sheet 2 of 2    3,913,397
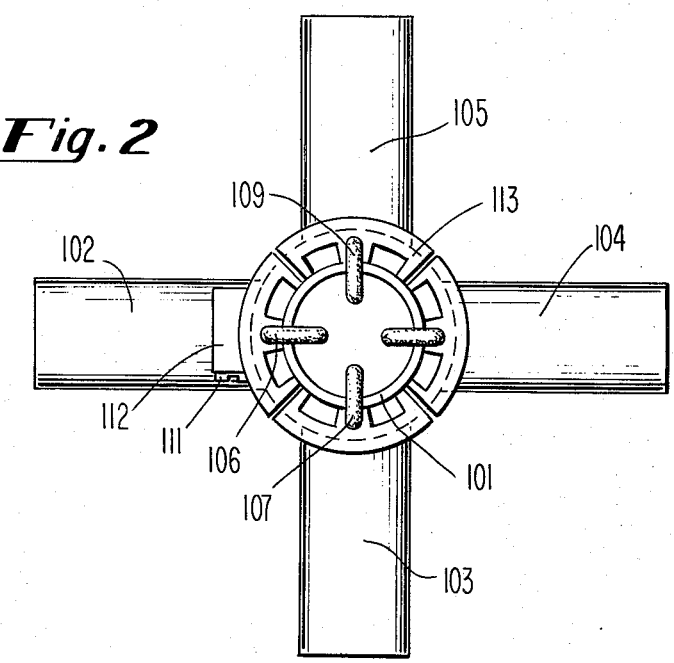
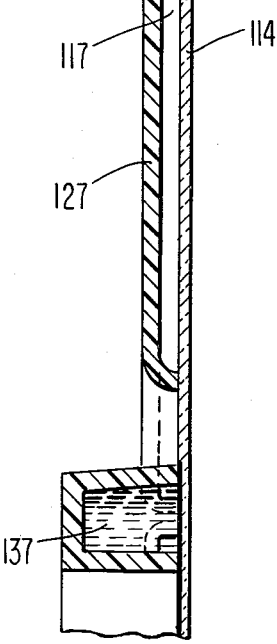
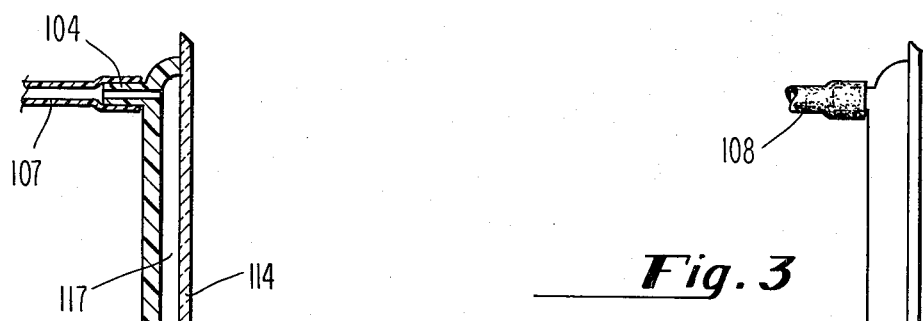
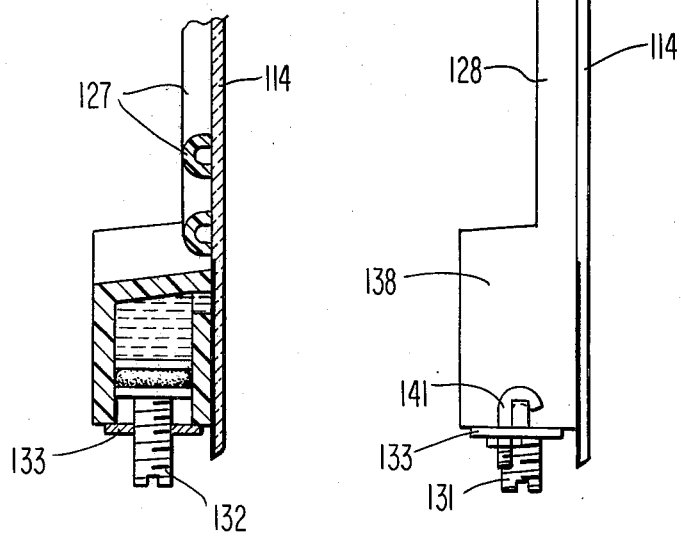

STATIC WIND SPEED AND DIRECTION INDICATOR

BACKGROUND OF THE INVENTION

This invention relates to the detection and measurement of wind speed and direction. More particularly, it relates to the measurement of static wind speed and direction utilizing a plurality of manometer tubes.

For purposes of professional meteorological observation and study, accurate and high quality wind detection apparatus is commercially available. Due to the specific needs of the professional market, however, that apparatus tends to be quite expensive. That is, in view of the need for high accuracy wind detection apparatus for professional use, the commercial market has responded with machinery of considerable complexity and technical sophistication, which necessarily tends to be quite expensive.

While the high price tags on such professional equipment presents no problems for professional meteoroligists and weather stations, they are generally prohibitive for amateur meteorologists and others interested in weather observation. Moreover, there exists a paucity of instruments available in the amateur low cost market, and none are believed entirely satisfactory from the standpoint of accuracy.

It is accordingly an object of the present invention to provide wind observation instruments which are relatively simple from a technical and structural standpoint and which therefore are relatively inexpensive. It is a further object that any such instruments demonstrate considerable operational accuracy, preferably without inclusion of complex mechanical or electronic apparatus which may prove difficult or expensive to maintain.

SUMMARY OF THE INVENTION

The present invention fulfills the above objects by utilizing a plurality of manometer tubes coupled respectively to wind receptacle cups facing in different directions. In particular, cups which face in opposite directions to one another are coupled respectively through individual manometer tubes to a single source of fluid, such that wind pressure from one direction forces the fluid level downward in the corresponding manometer tube, and forces the fluid level upward in the opposite manometer tube. By utilizing four cups with corresponding manometer tubes and two fluid receptacles, reading from all four tubes of the fluid level allows for calculation of speed as well as direction of the wind. Of course, if desired, more than two sets of opposing cups and manometer tubes may be utilized for an even more accurate determination. In an illustrative embodiment, four downwardly inclined cylindrical cups are mounted on a shaft, the outer end being opened and the inner communicating with the tops of corresponding manometer tubes. The manometer tubes each have vertical upper sections for high wind velocities and transverse V-shaped lower portions for low wind velocities. Oppositely directed cups have fluid supplied to their manometer tubes from a common source, preferably divided in two chambers, each having a top portion which slopes upwardly into the V-shaped portion of the tube.

The principles of the present invention therefore feature simplicity of design, without penalty to accuracy. Due to the V-shaped manometer tubes and sloping tops of the fluid well, winds of very low velocity may be detected as readily and as accurately as may strong winds. The four-direction wind receptacle system with opposite wind cups sharing a common fluid source allows for direction interpolation by noting fluid levels in each of the tubes.

DESCRIPTION OF THE DRAWINGS

FIG. 2 shows a top view of the FIG. 1 embodiment;

and FIGS. 3, 4 and 5 show various cutaway views of the manometer tubes of the embodiment of FIG. 1.

DETAILED DESCRIPTION

Figure 1:
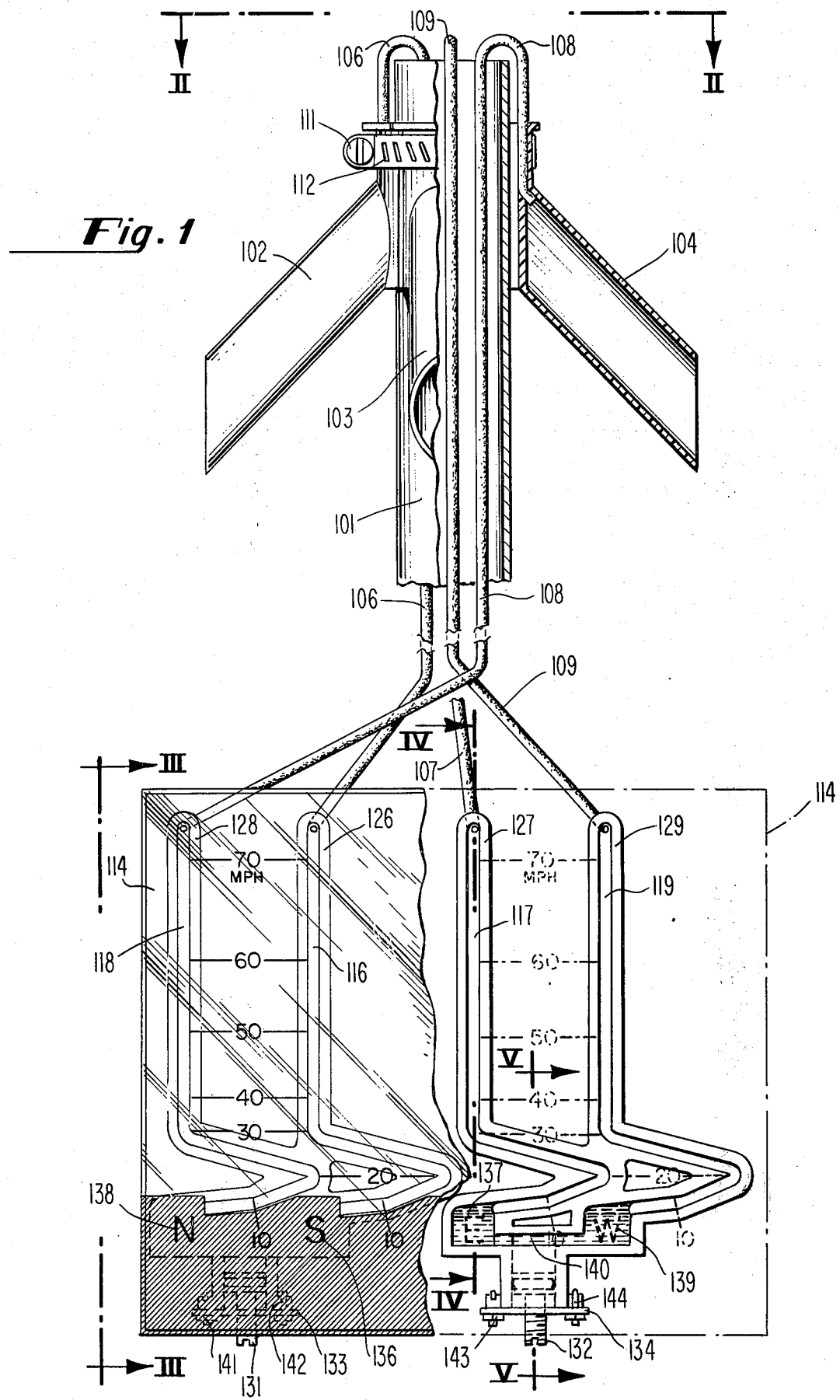
FIG. 1 shows in partial cutaway an illustrative embodiment of the principles of the present invention.

FIGS. 1 through 5 show various views of an illustrative embodiment of the principles of the present invention. The embodiment shown involves two parts, an exterior unit wherein the wind actually is sampled, and a unit including the manometer tubes from which the wind speed and direction actually may be read. The wind sensing cups are connected to the manometer tubes of the read out unit by means of separate passageway tubes.

In FIG. 1, a suitably mounted hollow mast 101 has mounted thereon wind sensing cups 102, 103, 104, and a fourth one, not shown, which are open at an outside end and which terminate in an opening directed to manometer tubes. While the shape of the cups 102 through 105 is a design option, the downwardly sloped configuration shown is beneficial in that precipitation such as rain is permitted to run off, rather than to occlude the wind sampling opening. Also, the four cups 102 through 105 are shown affixed to the mast 101 by means of a screw 111 and hose clamp 112. The upper portion of each of the cups 102 through 105 terminates respectively in a different passageway tube 106 through 109, which in turn are directed upwardly and over the top of the mast 101 and down through the hollow central portion thereof. The passageway tubes 106 through 109 are shown as a continuous run from the cups 102 through 105 all the way to the read out unit including the manometer tubes. It will be apparent, however, that combinations of rigid and flexible interlocking and molded tubes may be utilized to perform the function of the continuous flexible tubes shown 106 through 109.

From the cups 102 through 105 the tubes 106 through 109 extend without break or leakage to four manometer tubes. While the tubes may be embodied as free standing distinct elements, the embodiment shown utilizing molded open faced elements abutting a plate are advantageous from the standpoint of fabrication, operation and economics. A face plate 114 overlays four shaped tubular elements 126 through 129 to form, respectively, four manometer tube openings 116 through 119. The four passageway tubes 106 through 109 connect, respectively, at the top of the manometer tube openings 116 through 119 by means of a sleeve overlay such as 401 shown at the top of FIG. 4. Each of the manometer tubes 116 through 119 has a vertical upward portion and a lower horizontal V-shaped portion, the upward vertical portion serving to measure large wind speeds, and the lower V-shaped portion serving for lesser wind speeds. Each of the tubes 116 through 119 terminates in a fluid chamber 136 through 139, respectively. Moreover, chambers 136 and 138 are connected to each other by means of a passageway not shown, and chambers 137 and 139 communicate through a channel 140. Thus, together, chambers 136 and 138, and 137 and 139 each form receptacles providing fluid for two associated manometer tubes.

For purposes of fluid level adjustment in the chambers, a pair of screw adjustable pistons 131 and 132 are affixed at the bottom of the manometer fluid receptacles by means of plates 133 and 134 and hook shaped nuts and bolts 141 through 144 over ledges depending outwardly from the chamber forming around the pistons 131 and 132. Since the fluid chambers associated with the pistons 131 and 132 communicate directly with the four chambers 136 through 139, operation of the pistons 131 and 132, as desired, will serve to adjust the fluid level directly at the bottom of the manometer tubes 116 through 119 to correspond to a zero wind reading when no pressure is applied from the top of the tubes 116 through 119.

In this regard, it is interesting that the top surfaces of the chambers 136 through 139 slope upwardly at approximately a ten-to-one horizontal to vertical slope directly into the lower transverse portions of the horizontal "V's" of the tubes 116 through 119. As discussed hereinafter, the sloping configuration for the tops of the chambers 136 through 139 substantially enhances the operational accuracy of the embodiment shown.

The four manometer tubes 116 through 119 shown are coupled to the wind cups 102 through 105 such that oppositely directed cups (e.g. 102 and 104) are coupled to a pair of manometer tubes (e.g. 116 and 118) which share fluid chambers with one another (e.g. 136 and 138). Thus, a wind blowing into wind-cup 102 (e.g. from the northerly direction), will provide a downward force on the fluid in manometer tube 116, and consequently raise the fluid level in manometer tube 118 a proportional amount. The greater the force of such a wind, the higher the fluid column level will occur in tube 118. Correspondingly, a direct wind into wind-cup 103 (e.g. from the west) will provide downward pressure in manometer tube 117 and correspondingly raise the fluid level in tube 119. If a wind is directed between the cups, such as from the northwest, fluid levels will rise in tubes 117 and 118. The overlay plate 114 is transparent over the tubes 116 through 119 and is calibrated with numbers such that the fluid level may be read directly in terms of wind speed.

The embodiment shown, with its lower transverse V-sections and upwardly sloping fluid receptacles involves operational features which may not be immediately evident. One of the peculiarities of a pressure sensitive wind measuring system is that there is very little pressure generated at low wind velocities. The pressure varies with the square of velocity, and at 10 miles per hour there is a height rise in the fluid of only 0.08 inches. Since a great deal of the time wind velocities do not exceed 10 miles per hour it is important that means be provided at low wind velocities to amplify movement of the liquid column. To this end, the sloping lower portions of the tubes 116 through 119 allow for accurate measurement of low velocity, low pressure winds.

Utilization of the horizontal "V's" as shown, however, introduces other effects for which compensation must be made. In order to avoid capillary action and consequent inaccuracy of measurement, the tubes 116 through 119 must have rather substantial diameters. If the tubes 116 through 119 were to rise upwardly from the chambers 136 through 139, an undesirable vertical rise would result which effectively would obviate the sloped lower portion of the tube itself. This effect may be eliminated if the upper portions of each of the wells 136 through 139 are sloped as shown, such that the meniscus of the fluid is just at the entrance of the tube for zero wind. In preferred embodiments, the upper portion of each of the chambers 136 through 139 has a ten-to-one horizontal to vertical slope.

The foregoing is intended to be illustrative of the principles of the present invention, but it will be evident that the scope of the invention is not limited to the embodiment shown. Many alternative embodiments will occur to those skilled in the art without departure from the spirit or the scope of the present invention.

I claim:

1. A wind speed and direction indicator comprising: first and second mutually perpendicular, bilaterally responsive wind sampling means;
first and second interconnected fluid receptacle means corresponding respectively to said first and second wind sampling means;
an indicating liquid filling said receptacle means; and
two pairs of vertically extending manometer tube means having liquid-level indicating indicia thereon, each pair being supplied with fluid at bottom ends from a different one of said receptacle means and being coupled at a top end to receive wind pressure from a different one of said sampling means, each tube means of a pair being responsive to the pressure of wind in the opposite direction as its pair mate, said manometer tube means having a transversely inclined portion joining the top of their corresponding receptacle means, said receptacle means each having top surface portions sloping upwardly into their corresponding manometer tube means.

2. An indicator as described in claim 1 wherein each of said manometer tube means is configured with a substantially vertical top portion and a lower portion including said transversely inclined portion.

3. An indicator as described in claim 2 wherein said lower portion includes two transversely inclined portions configured in vertical cross section as a horizontal "V".

4. An indicator as described in claim 1 wherein the slope of said top surface portions is substantially at a 10:1 horizontal to vertical ratio.

5. An indicator as described in claim 1 wherein said fluid receptacle means each include first and second chambers communicating with one another, each chamber supplying an individual one of said manometer tube means.

6. An indicator as described in claim 1 wherein said sampling means each include first and second wind cups facing in opposite directions to one another and being coupled respectively with different ones of a pair of said manometer tube means.

7. An indicator as described in claim 6 wherein each of said wind cups comprises a downwardly sloping cylinder open at an outside end and terminating at an inside end with a passageway to the top of an associated manometer tube means.

8. A static wind speed and direction indicator comprising:

four wind sampling cups arrayed toward the four points of the compass;
first and second fluid receptacle means, each having two fluid chambers communicating with one another;
indicating fluid filling said receptacle means;
four vertically extending manometer tube means having liquid-level indicating indicia thereon supplied respectively at bottom ends by fluid from a different one of said chambers, each of said tube means having an upper vertical portion corresponding to high wind velocities and a lower, horizontal V-shaped portion corresponding to low wind velocities, said chambers each including a top portion sloping upwardly into the corresponding manometer tube means; and
four passageway means for coupling the tops of said manometer tube means to respective ones of said sampling cups.

* * * * *